United States Patent
Buendgen et al.

(10) Patent No.: US 11,831,755 B2
(45) Date of Patent: *Nov. 28, 2023

(54) GENERATING HYPERVISOR PROTECTED KEY FOR CRYPTOGRAPHY

(71) Applicant: INTERNATIONAL BUSINESS MACHINES CORPORATION, Armonk, NY (US)

(72) Inventors: Reinhard Theodor Buendgen, Tuebingen (DE); Christian Borntraeger, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/452,105

(22) Filed: Oct. 25, 2021

(65) Prior Publication Data
US 2022/0045853 A1    Feb. 10, 2022

Related U.S. Application Data

(63) Continuation of application No. 16/919,159, filed on Jul. 2, 2020, now Pat. No. 11,196,548.

(51) Int. Cl.
  *H04L 9/08* (2006.01)
  *G06F 9/455* (2018.01)
  *H04L 9/32* (2006.01)

(52) U.S. Cl.
  CPC ........ *H04L 9/0825* (2013.01); *G06F 9/45545* (2013.01); *H04L 9/0869* (2013.01); *H04L 9/3226* (2013.01)

(58) Field of Classification Search
  CPC ... H04L 9/0825; H04L 9/0869; H04L 9/3226; G06F 9/45545
  (Continued)

(56) References Cited

U.S. PATENT DOCUMENTS

| 8,996,887 B2 | 3/2015 | Kadatch |
| 9,231,923 B1 | 1/2016 | Cignetti |

(Continued)

FOREIGN PATENT DOCUMENTS

| CN | 104246789 A | 12/2014 |
| CN | 110235134 A | 9/2019 |

(Continued)

OTHER PUBLICATIONS

IBM, "z/Architecture Principles of Operation," Thirteenth Edition, Sep. 2019 SA22-7832-12, http://publibfp.dhe.ibm.com/epubs/pdf/a227832c.pdf, pp. i-1-38, 7-52-7-133 & 10-56-10-80.

(Continued)

*Primary Examiner* — Moeen Khan
(74) *Attorney, Agent, or Firm* — Caleb D. Wilkes

(57) ABSTRACT

A method, a computer system, and a computer program product for cryptography are provided. A guest virtual server registers with a trusted hypervisor by using guest credentials. A guest wrapping key associated with the guest credentials is generated. A satellite virtual server instance that shares a master key with the virtual guest server is generated in the trusted hypervisor. A copy of the guest wrapping key is passed to the satellite virtual server instance. A random guest key is wrapped with the guest wrapping key, thereby producing a wrapped guest key. The wrapped guest key is rewrapped with the master key to form a protected guest key.

20 Claims, 14 Drawing Sheets

(58) Field of Classification Search
USPC .......................................................... 713/171
See application file for complete search history.

(56) References Cited

U.S. PATENT DOCUMENTS

| | | | |
|---|---|---|---|
| 9,544,137 B1* | 1/2017 | Brandwine | G06F 21/335 |
| 9,720,721 B2 | 8/2017 | Bacher | |
| 2012/0027213 A1 | 2/2012 | Scarlata | |
| 2013/0227303 A1 | 8/2013 | Kadatch | |
| 2017/0171179 A1* | 6/2017 | Buendgen | H04L 9/3263 |
| 2017/0222981 A1 | 8/2017 | Srivastav | |
| 2017/0277898 A1 | 9/2017 | Powell | |
| 2018/0189090 A1* | 7/2018 | Hoppert | G06F 9/45558 |
| 2018/0212778 A1 | 7/2018 | Novak | |
| 2018/0314827 A1* | 11/2018 | Wells | G06F 9/45558 |
| 2019/0260718 A1 | 8/2019 | Buendgen | |
| 2020/0067700 A1* | 2/2020 | Bergeron | H04L 41/046 |
| 2021/0081819 A1* | 3/2021 | Polleri | G06F 16/252 |
| 2021/0344485 A1* | 11/2021 | Levin | H04L 63/06 |

FOREIGN PATENT DOCUMENTS

| | | |
|---|---|---|
| CN | 115803740 A | 3/2023 |
| DE | 112021002099 T5 | 2/2023 |
| GB | 2611276 A | 3/2023 |
| WO | 2019173015 A1 | 9/2019 |
| WO | 2020036724 A1 | 2/2020 |
| WO | 2022003505 A1 | 1/2022 |

OTHER PUBLICATIONS

International Search Report and Written Opinion of the International Searching Authority, International application No. PCT/IB2021/055594, dated Sep. 28, 2021, 8 pages.

Mell et al., "The NIST Definition of Cloud Computing", National Institute of Standards and Technology, Special Publication 800-145, Sep. 2011, 7 pages.

Pending U.S. Appl. No. 16/919,159, filed Jul. 2, 2020, entitled: "Hypervisor Protected Key," 38 pgs.

IBM: List of IBM Patents or Patent Applications Treated As Related (Appendix P), Oct. 26, 2021, 2 pages.

Buendgen et al., "Hypervisor Protected Key", Australian Application No. AU2021302892, Filing Date: Jun. 24, 2021, 10 pages. (Equivalent of WO 2022/003505).

Buendgen et al., "Hypervisor Protected Key", Japanese Application No. JP2022-577133, Filing Date: Jun. 24, 2021, 41 pages. (Equivalent of WO 2022/003505).

Buendgen et al., "Hypervisor Protected Key", Korean Application No. 2023-7000008, Filing Date: Jun. 24, 2021, 34 pages. (Equivalent of WO 2022/003505).

* cited by examiner

200

202 guest VS: requests HV to generate a guest wrapping key and to associate the guest wrapping key with a guest secret

204 HV: generates a new random key and associates the new random key with a cryptographic hash of the guest secret

206 HV: stores the association of the hash and the random key in a repository

FIG. 2

GENERATING HYPERVISOR PROTECTED KEY FOR CRYPTOGRAPHY

BACKGROUND

Field of the Invention

The invention relates generally to cryptography and to providing a cryptographic key object to a guest virtual server for use in cryptographic operations.

Related Art

The world is moving in the direction of a digital society. More and more processes, products and services are delivered in digital form. In parallel, privacy requirements are being increased and enterprises and government organizations try to protect their digital assets. Cryptography is a core technology for digital privacy and is based on secret keys that should never fall in the hands of unauthorized systems or persons. In addition, the number and sophistication of cyber-attacks have increased. Thus, the need to protect sensitive data is increasing significantly over time.

If it is assumed that cryptographic algorithms have no flaws, the security of cryptography depends on the secrecy of the used keys. Quite often, a key may be in the memory of a user system to be used in a cryptographic function. Thus, such keys are used in a form of "clear key crypto". Because an access to that key will also allow an access to the encrypted data, the exposure of the key would break the secrecy.

Therefore, there are other ways of doing cryptography with a key that is not available in the memory system of the user of the involved cryptographic function. For example, the user system may call into a hardware security module (HSM). The user system then has a token, a wrapped key or another way of telling the hardware security module which key is to be used. Because the token or wrapped key will not provide any access to the encrypted data unless a party also has access to the hardware security module, using an HSM may provide additional security. Known disadvantages of such an HSM solution are that often the bandwidth becomes limited and the latency of the operations is increased.

A third variant, denoted as a "protected key" concept, has been added to mainframe computers, like the IBM Z systems. This variant uses a wrapped key, which is formed by a wrapping key encrypting another key. The wrapping key is known by the (trusted) firmware. This wrapping is initiated by a hardware security module, e.g., a crypto express adapter. The user system of the wrapped key may only have access to the wrapped key, while the CPU can do crypto-operations with the unwrapped key. Such an approach combines the speed of clear key crypto with the security level of protected keys.

Protected keys may have been encrypted with a virtual server (VS) specific master key (VS-MK) that is specific to a running instance of the virtual server and that is not accessible to the virtual server. The virtual server master key VS-MK may be hidden in the firmware.

The virtual server master key (VS-MK) is derived from the host master key (host-MK) and from the virtual server specific pattern provided by the host when the virtual server is configured. Inside of each virtual server, the firmware may provide an interface to convert a plaintext key into a protected key wrapped by the master key that is specific to the virtual server that calls. An implementation of this approach exists today on mainframe systems, like IBM Z.

This approach is problematic if the virtual server master keys are specific to a running instance of a virtual server and if protected keys are only valid for that specific running instance of the virtual server. The approach is problematic if protected keys are no longer valid if the virtual server is rebooted, suspended to disk and resumed or migrated to another system.

Hence, the problem underlying the here proposed method and system may be seen in how a key can be used as a protected key in multiple (boot) instances of virtual servers such that the virtual server never has to store data that can be used to disclose the key in text form. This may be achieved under the boundary conditions that there is no access to the host and that hosted data can be stored securely.

In this context, some documents have been published: document U.S. 2017/0277898 A1 discloses a processor employing a security module to manage authentication and encryption keys for the processor. The security module can authenticate itself to other processing systems, such that as processing systems providing software to be executed at the processor, can generate keys for encrypting address spaces for the provided software, and can securely import and export information at the encrypted address space to and from the processing system.

Additionally, document U.S. Pat. No. 8,996,887 B2 discloses a method for providing data. The method includes receiving a first request from a first virtual machine (VM) to store data, obtaining the data and an access control list (ACL) of authorized users, obtaining a data key that has a data key identifier, encrypting the data key and the ACL using a wrapping key to generate a wrapped blob, encrypting the data, storing the wrapped blob and the encrypted data, and providing the data key identifier to users on the ACL.

However, also these approaches do not solve the above described problem of using protected keys when a hardware security module is not available or is not practical.

SUMMARY

Embodiments of the present invention may include a computer-implemented method, a computer system, and a computer program product for cryptography A guest virtual server registers with a trusted hypervisor by using guest credentials. A guest wrapping key associated with the guest credentials is generated. A satellite virtual server instance that shares a master key with the virtual guest server is generated in the trusted hypervisor. A copy of the guest wrapping key is passed to the satellite virtual server instance. A random guest key is wrapped with the guest wrapping key, thereby producing a wrapped guest key. The wrapped guest key is rewrapped with the master key to form a protected guest key.

The trusted hypervisor may pass a copy of the guest wrapping key to the satellite virtual server instance. The trusted hypervisor may generate a random guest key. The trusted hypervisor may wrap the random guest key with the guest wrapping key, thereby producing a wrapped guest key. Upon receiving a conversion request from the guest virtual server, a conversion of the wrapped guest key to change the wrapped guest key to a protected key may be performed. The conversion may include rewrapping the wrapped guest key with the master key to form a protected guest key. The protected guest key serves as the cryptographic key object.

The computer-implemented method, computer system, and computer program product for cryptography may offer multiple advantages, technical effects, contributions and/or improvements.

The option to use the concept of a protected key without the requirement for a hardware security module (HSM) is a significant advantage over existing solutions, because the disclosed invention makes it possible to avoid the overhead and/or cost that are required for HSMs. The invention may provide the same or at least an equivalent level of security for encryption keys as those solutions that require a hardware security module. The inventive solution may be completely software-based and may be free of any additionally required hardware. Thus, the inventive solution may enable lower price points for cryptographic solutions at the same or an equivalent security level until now only offered by hardware-based security module-based solutions.

One helpful advantage of the invention is that protected keys "live longer" than an instance of a virtual system running on a hypervisor. The additionally implemented satellite virtual server may be neglected in terms of performance degradation in light of the sheer number of virtual machines that are typically executed on a hypervisor. Furthermore, the functionality of the satellite virtual server may be limited to one or only a few functions or services. For example, the satellite virtual server may perform a single transaction—namely the conversion of the wrapped guest key into the protected key. The hypervisor should be a trusted hypervisor. In typical computing environments in which protected keys may be needed—e.g., in mainframe computing environments—the hypervisor may be seen as trusted-by-design, because a series of firmware components—typically implemented in hardware—may support, or may be integrated with, the functioning of the hypervisor.

The here-proposed invention may also be implemented during runtime of the mainframe computing system, because no additional hardware has to be installed. Thus, no downtime of the operating system and no reduced productivity time from such downtimes are further advantageous consequences of the proposed inventive solution.

In the following, additional embodiments of the invention will be described.

According to one advanced embodiment of the invention, the conversion further includes the satellite virtual server instance using the guest wrapping key to unwrap the wrapped guest key. Hence, the delivery of the protected key by the satellite virtual server may happen without a hardware security module.

According to another embodiment of the invention, the conversion request includes the guest credentials as an argument, e.g. as a conversion argument. Hence, the delivery of the protected key by the satellite virtual server may happen completely without a hardware security module.

According to another embodiment of the invention, the trusted hypervisor may maintain a memory storing guest wrapping keys associated with data needed to verify the guest credentials. Hence, guest wrapping keys of different guest virtual machines may be maintained persistently—i.e., may survive a shutdown of the related guest virtual machine—and the credentials from different guest virtual servers may remain verifiable.

According to a further embodiment of the invention, the trusted hypervisor may use a cryptographic one-way function for computing the data needed to verify the guest credentials. Such cryptographic one-way function may be a cryptographic hash function. This embodiment improves improve the security of the hypervisor, because it removes a need to store credentials of guests.

According to one advantageous embodiment of the invention, the memory for storing the keys may be protected with a passphrase. Hence, with this embodiment no uncontrolled access to the key store is allowed. The key memory may be protected against non-allowed access.

According to one enhanced embodiment of the invention, the guest wrapping key within the memory may be protected by a hardware security module. This embodiment may represent an advanced option for an enhanced protection of the guest wrapping key when a hardware security module is available to the hypervisor but not to all guests hosted by the hypervisor.

According to an advantageous embodiment of the invention, the virtual server specific data may be data stored in a crypto control block (CRYCB) of a virtual machine. This data feature may apply for the guest virtual server as well as for the satellite virtual server. Hence, with this embodiment a trustworthy hypervisor can configure two guests to share or to not share configuration data dependent on the security requirements. In other words, two standard guests would not share security relevant data, but a guest and its satellite guest would.

According to another advantageous embodiment of the invention, the satellite virtual server may have a sole interface and that sole interface may connect to the trusted hypervisor. Hence, with this embodiment no other interface or API of the satellite virtual server may be available or useable, and the satellite virtual server may be prevented from being misused to compromise the here-proposed security invention.

Alternatively or additionally, and according to a further embodiment of the invention, the trusted hypervisor may also use a service—e.g., an additional service—from the satellite virtual server for generating a random key and for wrapping the random key with the guest wrapping key. Thus, for this embodiment all highly sensitive core functions for the here-proposed security invention may be handled between the trusted hypervisor and the satellite virtual server.

According to one permissive embodiment, the invention may also include authorizing, by the trusted hypervisor, each request following the registration. The authorizing may include using additional guest credentials provided with a respective request following the registration. These features allow a guest to register multiple wrapping keys associated with multiple credentials so that key generation and wrapping key conversion operations can operate on multiple independent key spaces.

According to another advanced embodiment of the method, the hypervisor may authorize a further request of the guest virtual server following the registration. The authorizing may additionally be based on guest specific data. The guest specific data for this embodiment may be, e.g., boot volume data or guest owner data which may have been recorded during the registration request. Hence, with these features the possibility for compromising the proposed security invention can be further reduced.

BRIEF DESCRIPTION OF THE DRAWINGS

It should be noted that a person skilled in the art will understand from the above description and from the following description that, unless otherwise notified, any combination of features belonging to methods, systems, or computer program products described herein is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
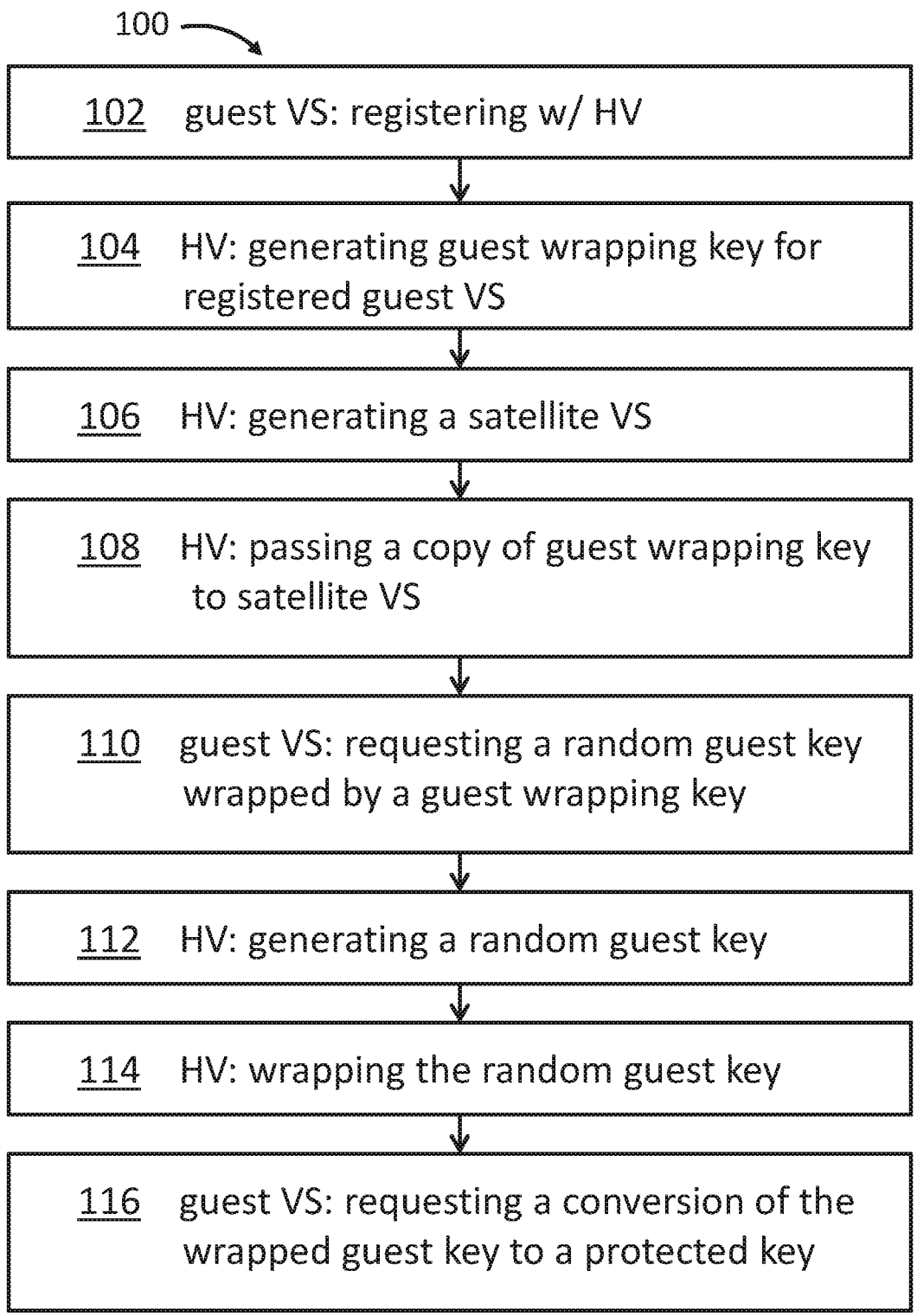

Preferred embodiments of the invention will be described, by way of example only, and with reference to the following drawings:

FIG. 1 shows a block diagram of an embodiment of the inventive computer-implemented method for providing a cryptographic key object to a guest virtual server for use in cryptographic operations.

FIG. 2 shows an exemplary flowchart for generating the guest wrapping key.

Figure 3:
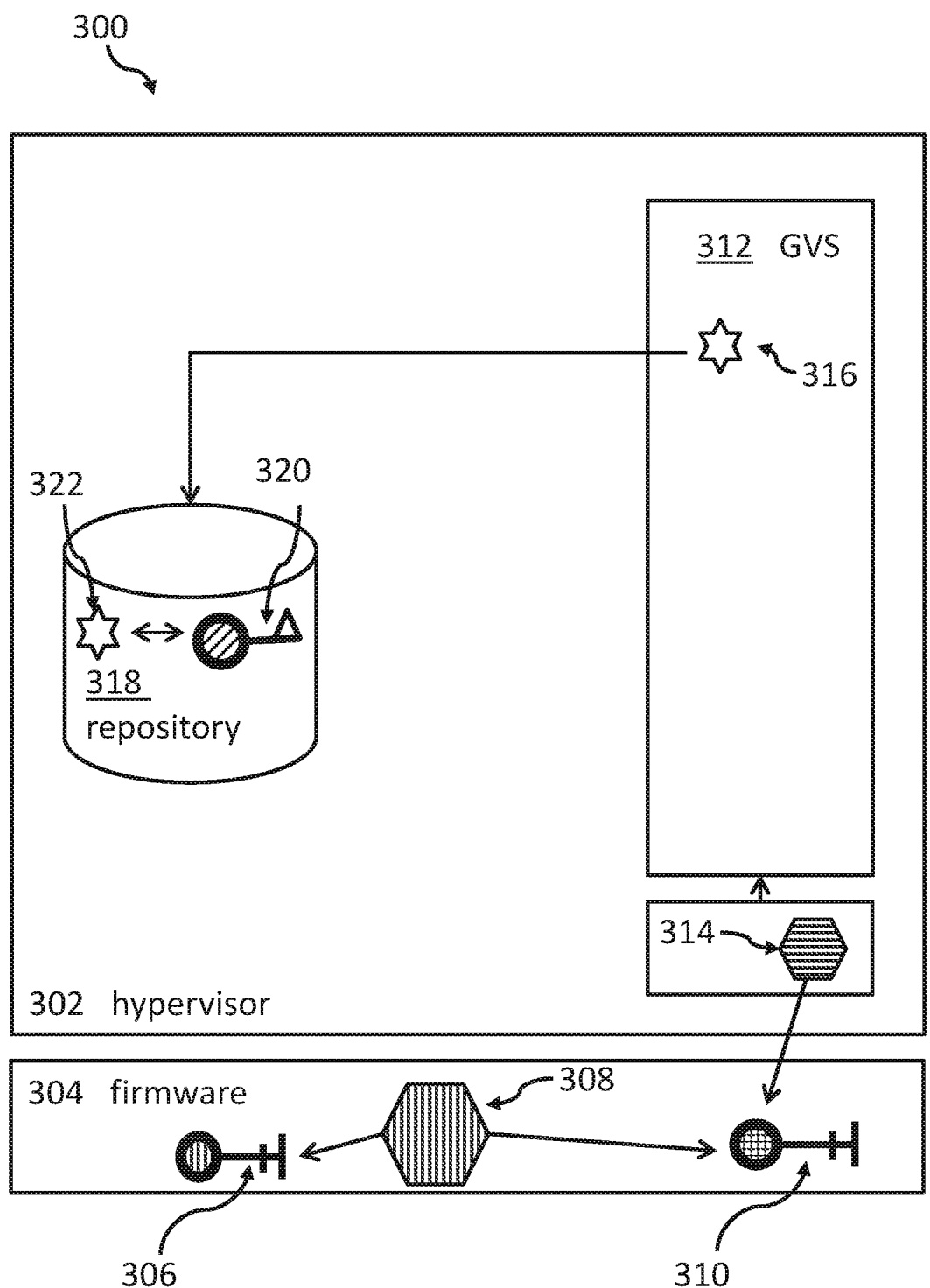

FIG. 3 shows a block diagram of components instrumental for generating the guest wrapping key.

Figure 4:
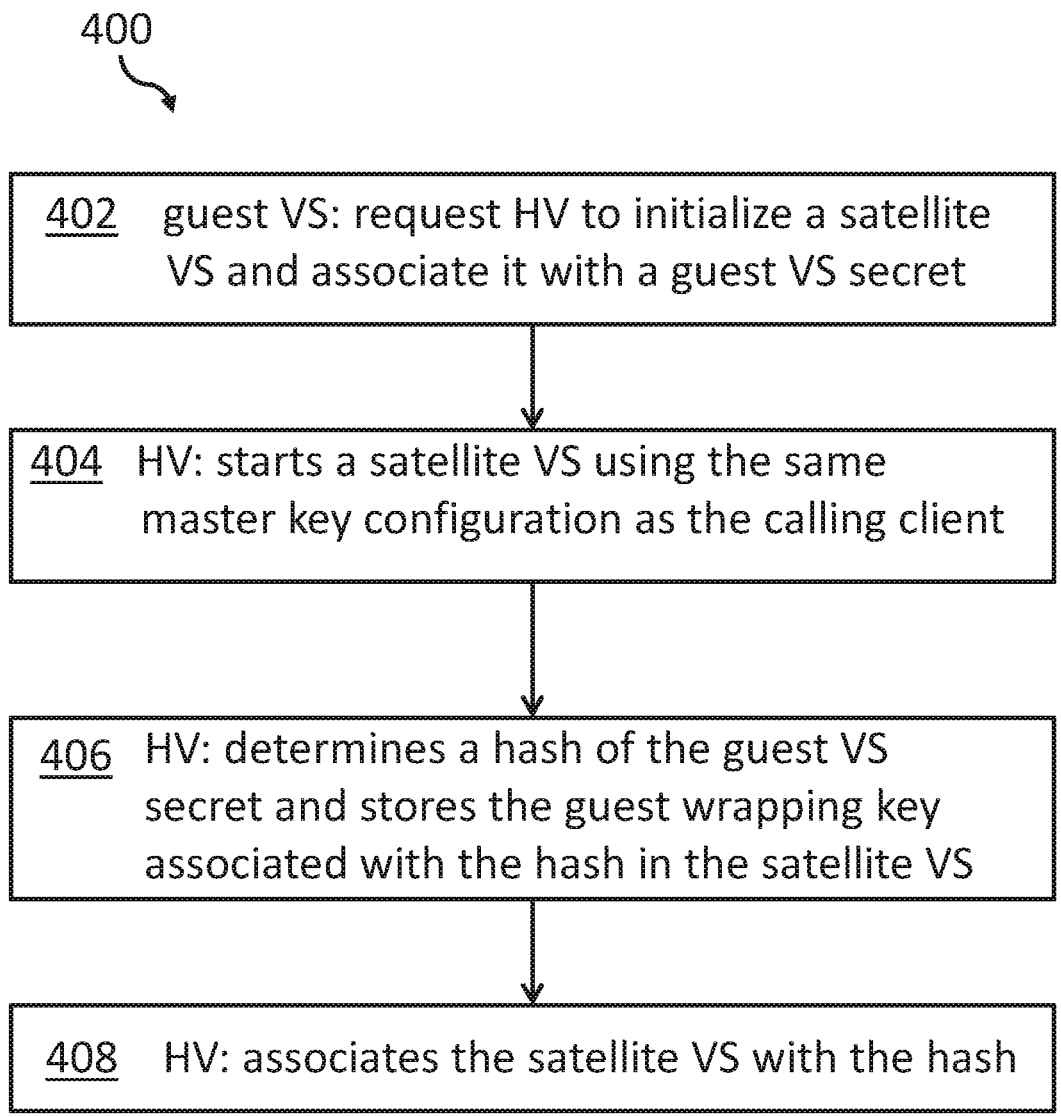

FIG. 4 shows an exemplary flowchart for an initiation of the satellite virtual server.

Figure 5:
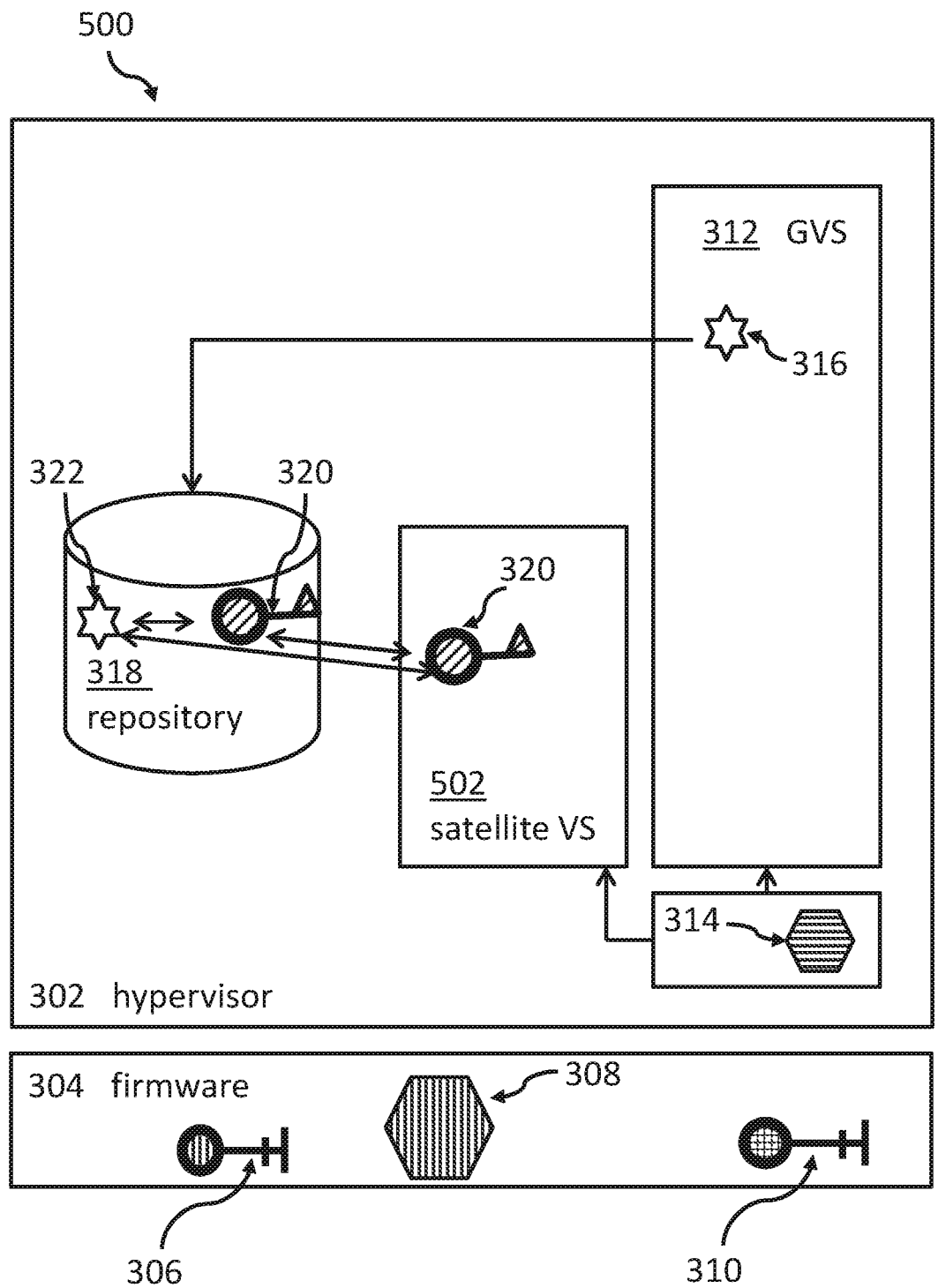

FIG. 5 shows a block diagram of components involved in the process of initiating the satellite virtual server.

Figure 6:
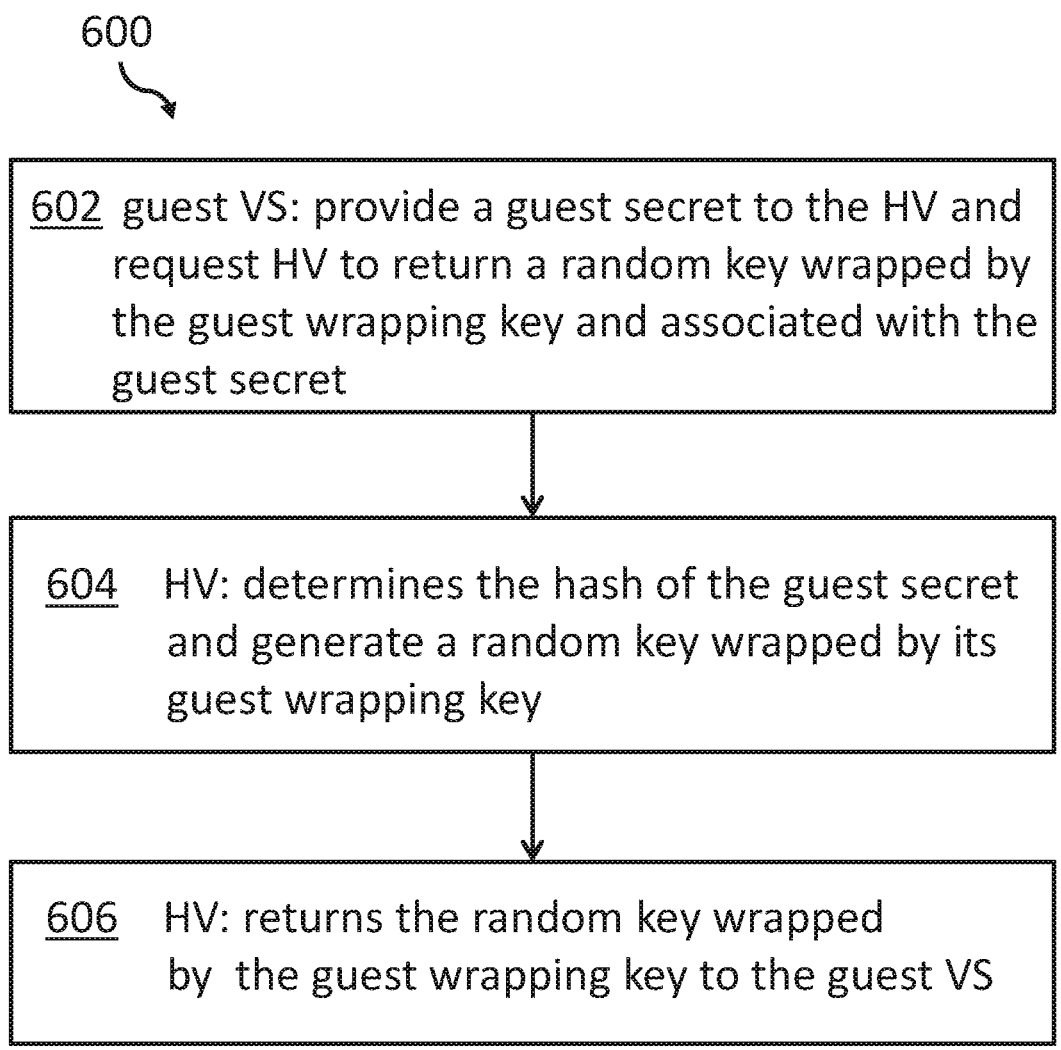

FIG. 6 shows an exemplary flowchart for generating the random wrapped key.

Figure 7:
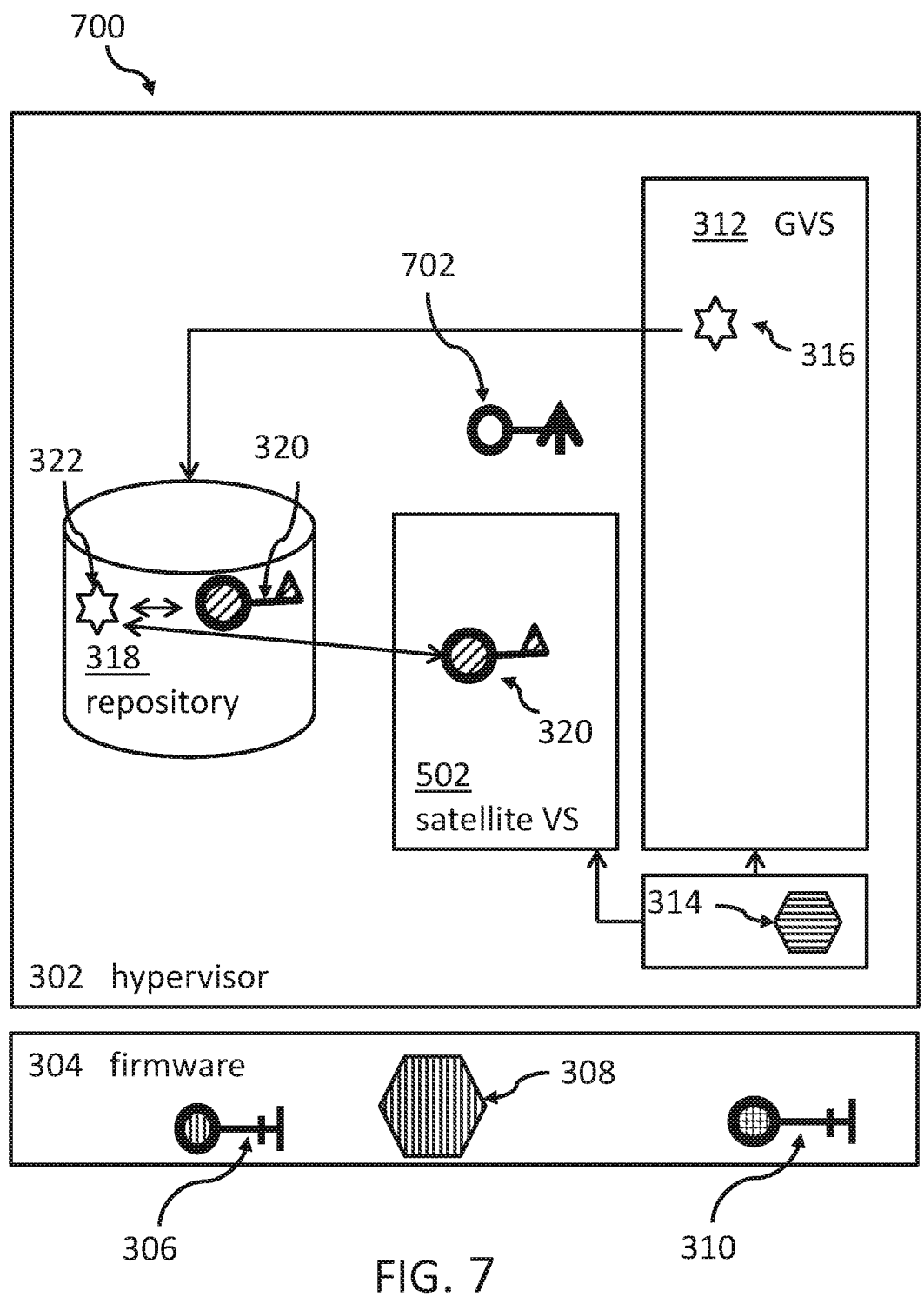

FIG. 7 shows a block diagram of components including components related to the generation of the random key.

Figure 8:
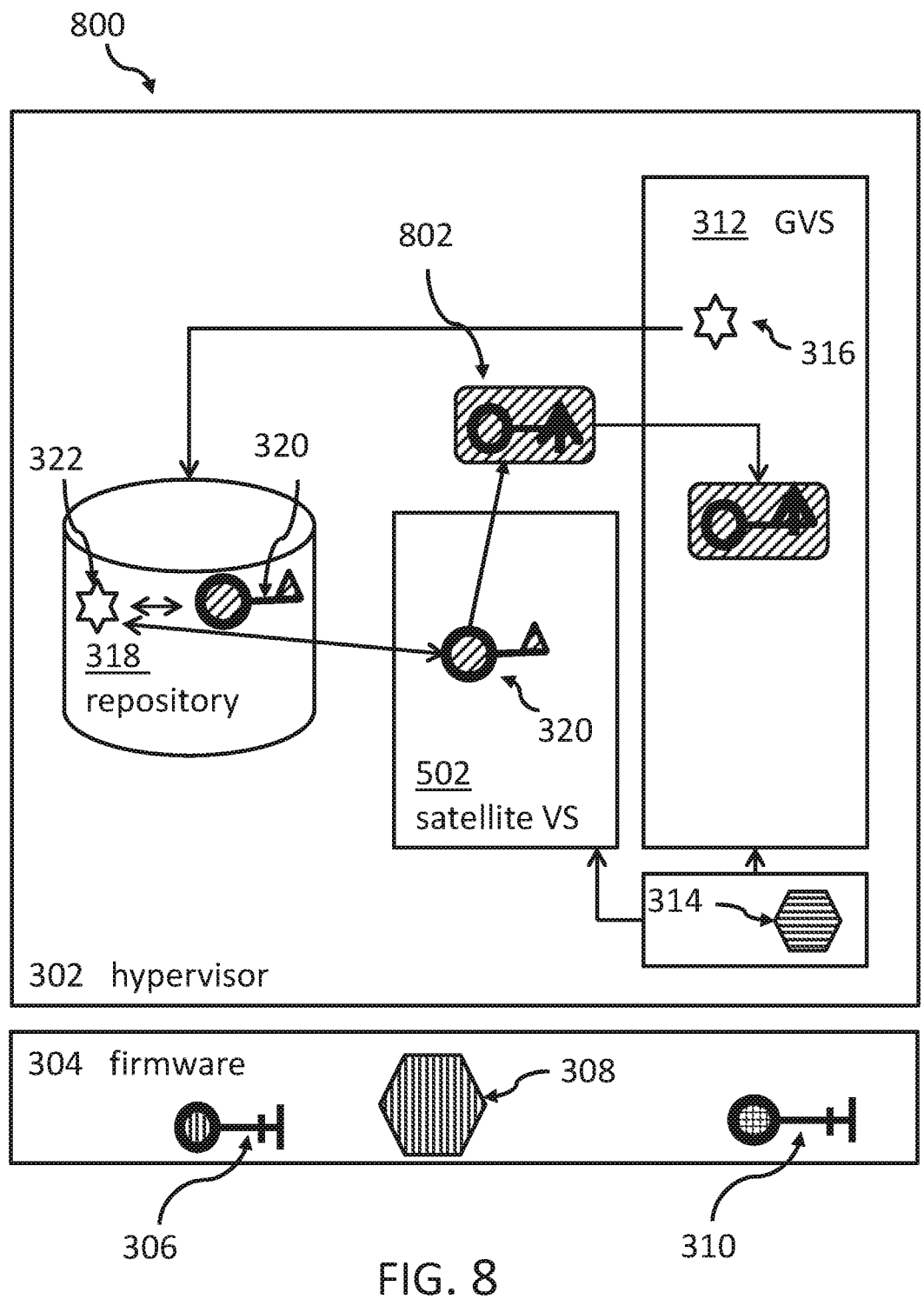

FIG. 8 shows a block diagram of components including components related to the generation of the wrapped random key.

Figure 9:
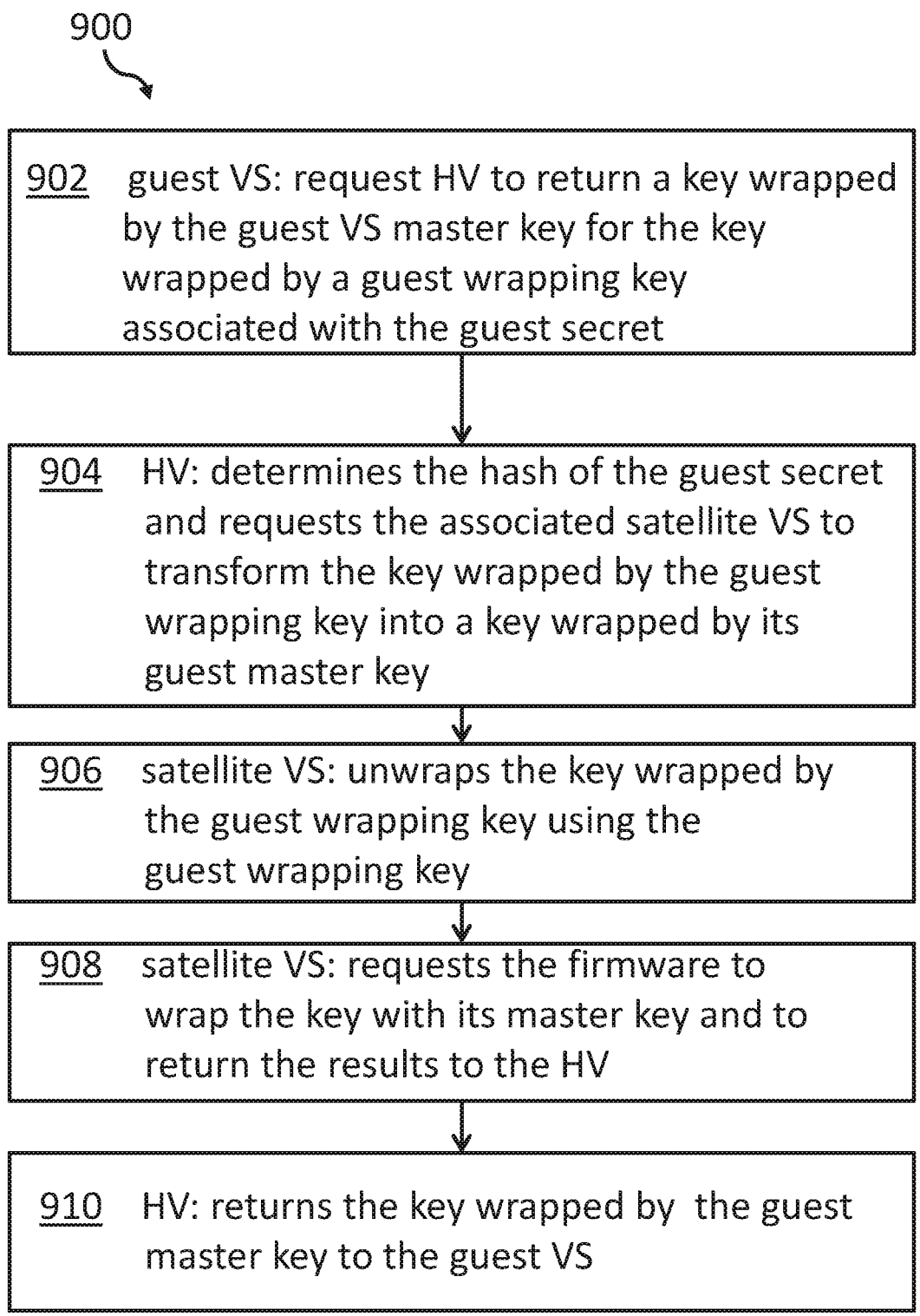

FIG. 9 shows an exemplary flowchart for the transformation of the wrapped key into a protected key.

Figure 10:
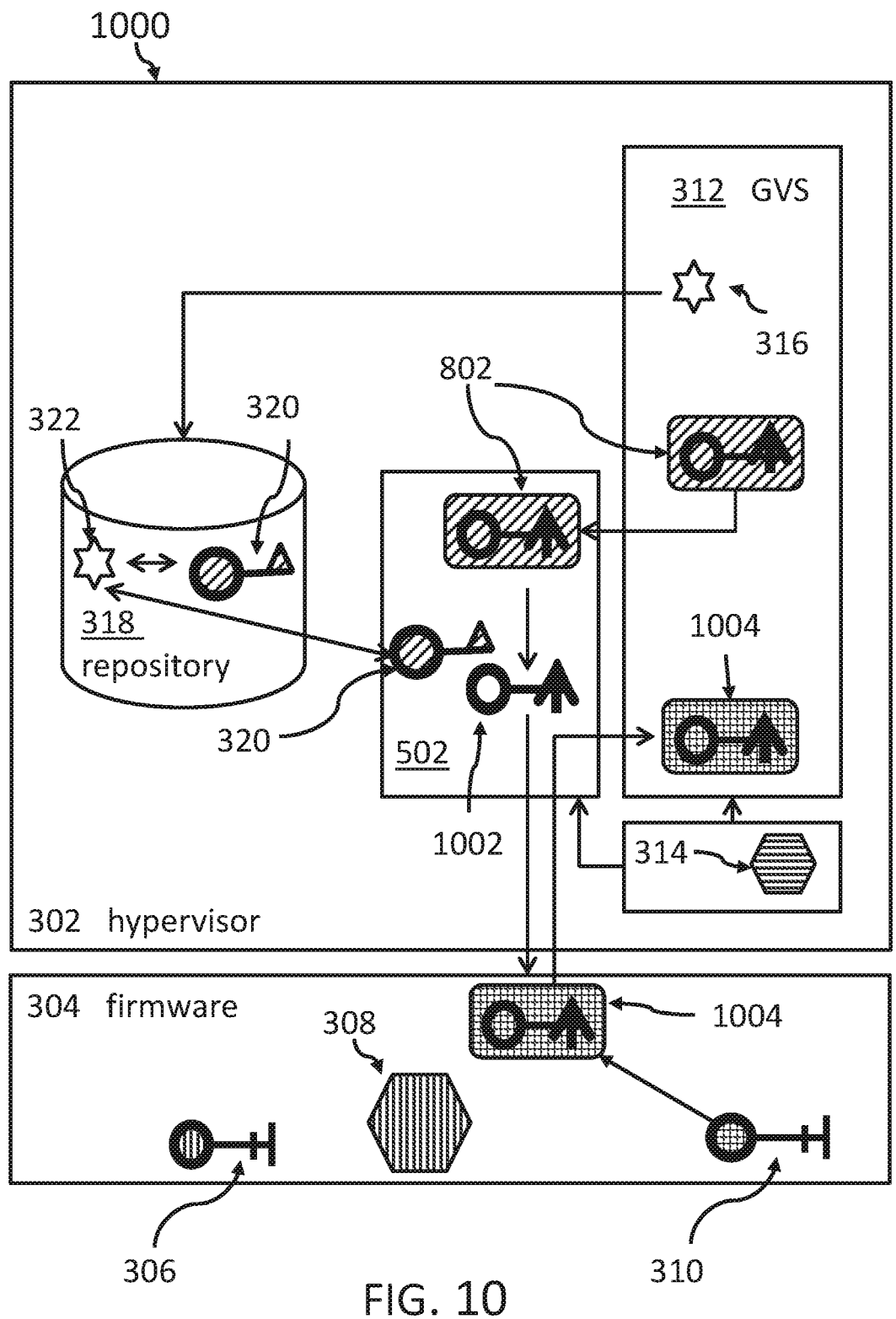

FIG. 10 shows a block diagram of all components supporting the generation of the protected key.

Figure 11:
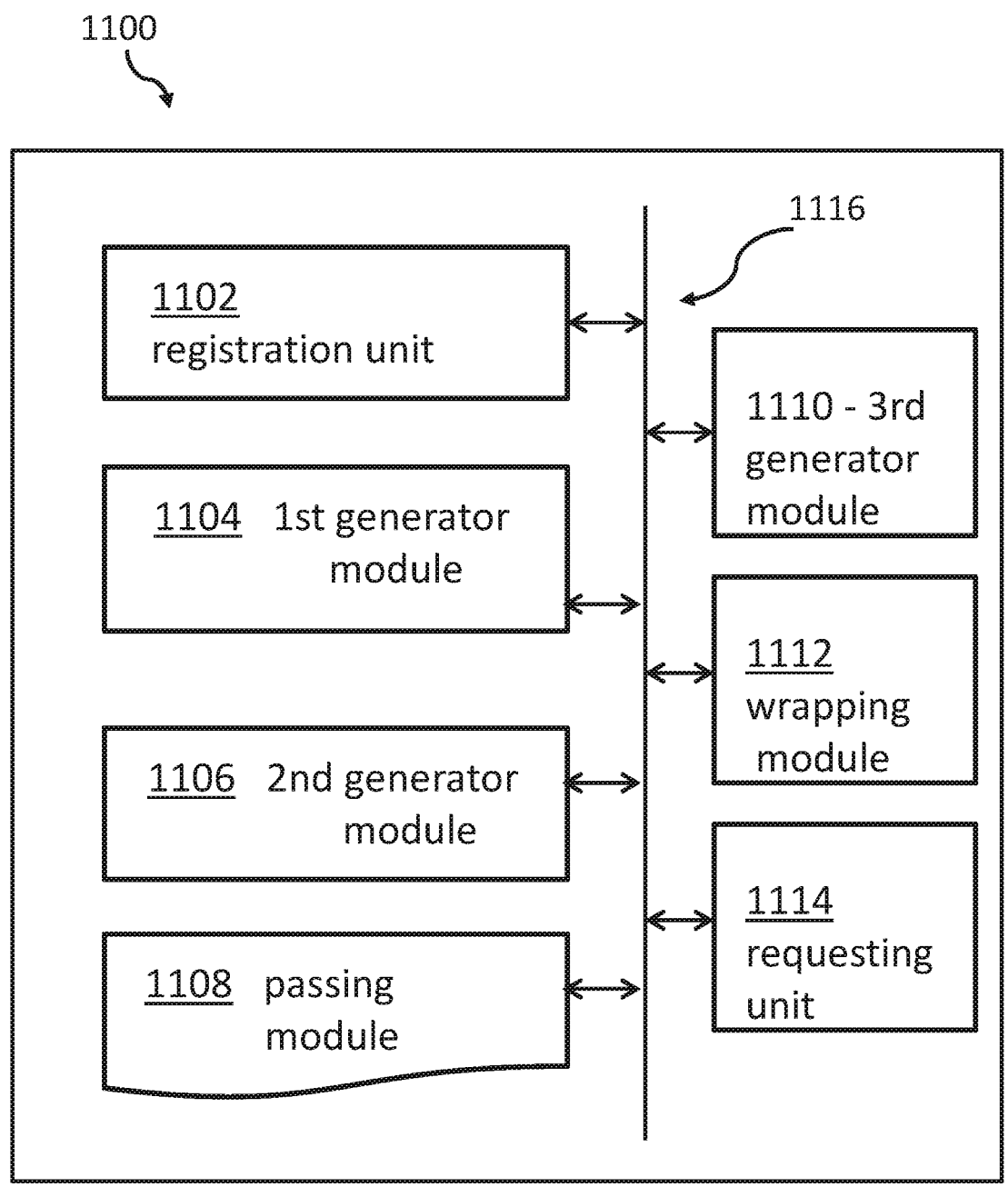

FIG. 11 shows a block diagram of an embodiment of the inventive protected key providing system that provides a cryptographic key object to a guest virtual server for use in cryptographic operations.

Figure 12:
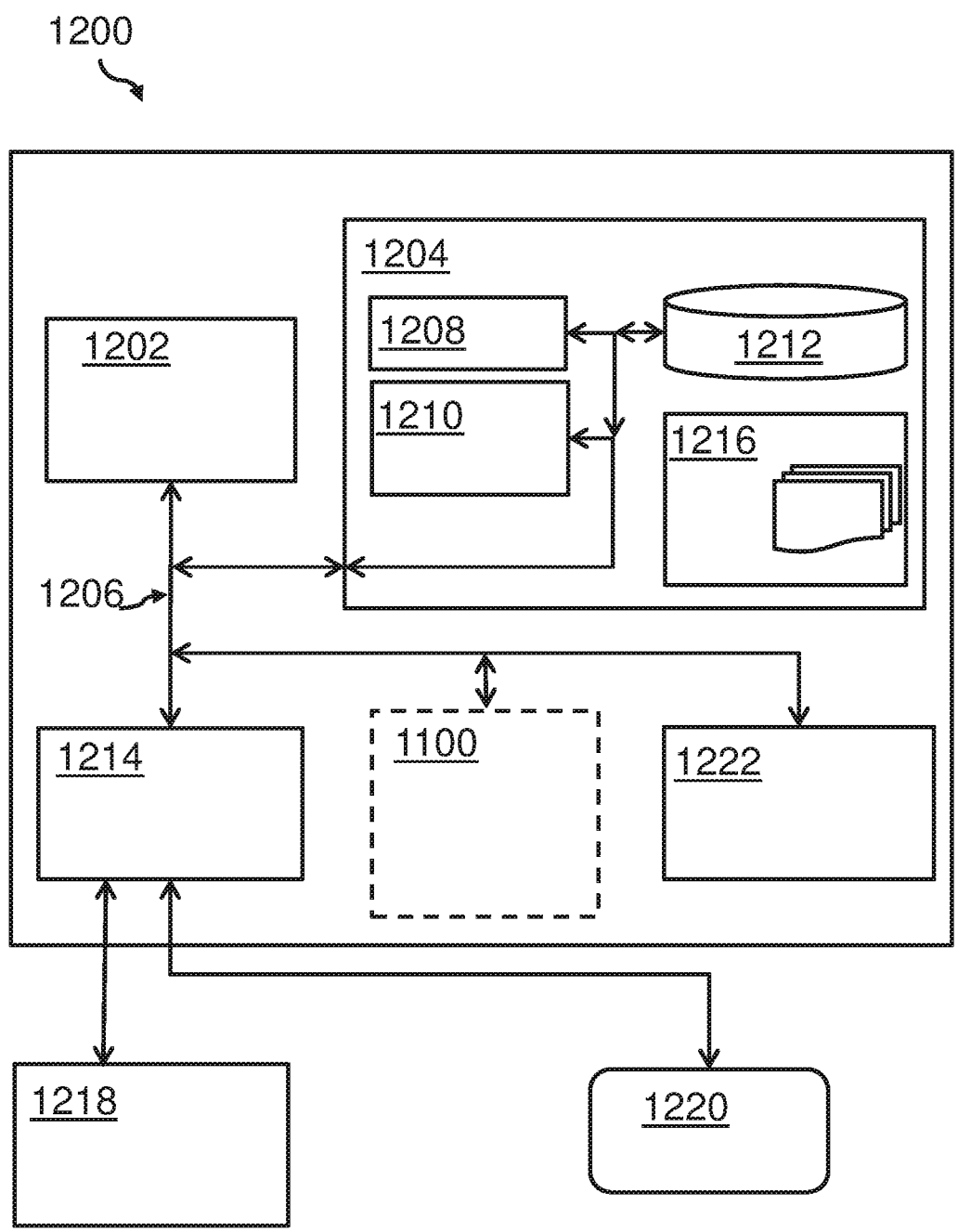

FIG. 12 shows a block diagram for a computing system that includes the protected key providing system according to FIG. 11.

Figure 13:
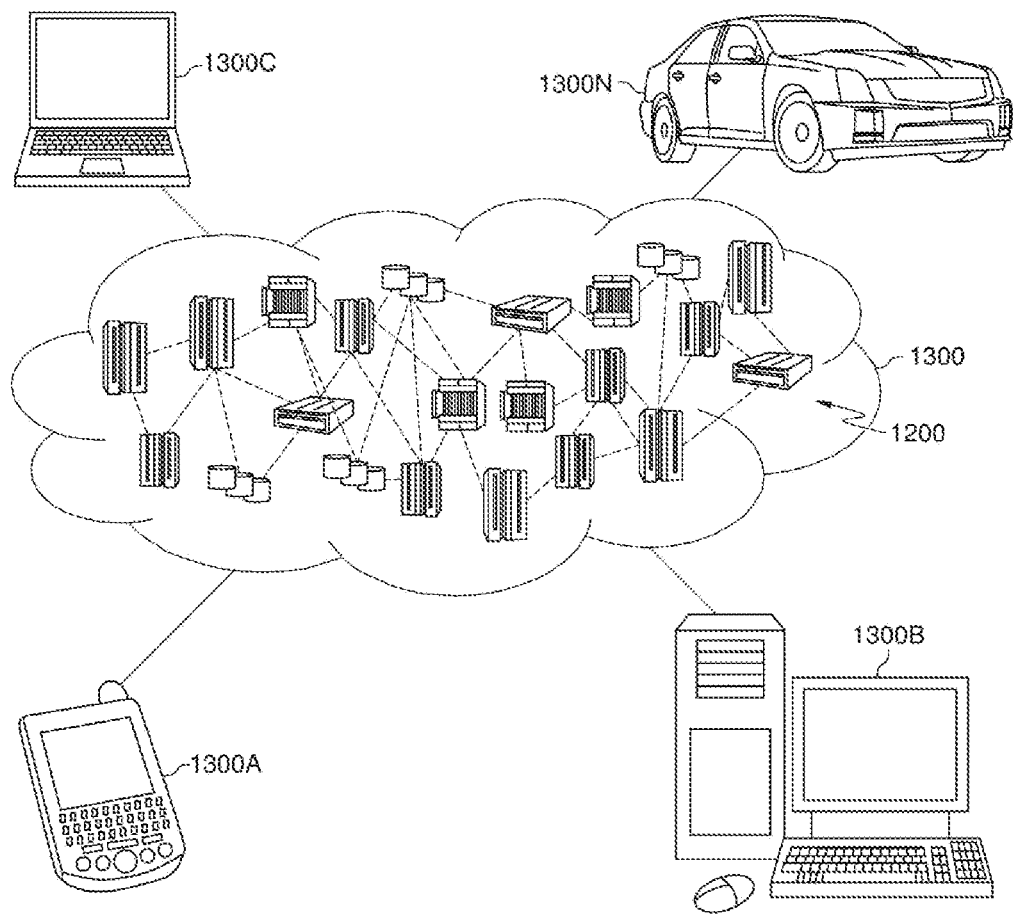

FIG. 13 is a block diagram of an illustrative cloud computing environment including the computer system depicted in FIG. 12, in accordance with an embodiment of the present disclosure.

Figure 14:
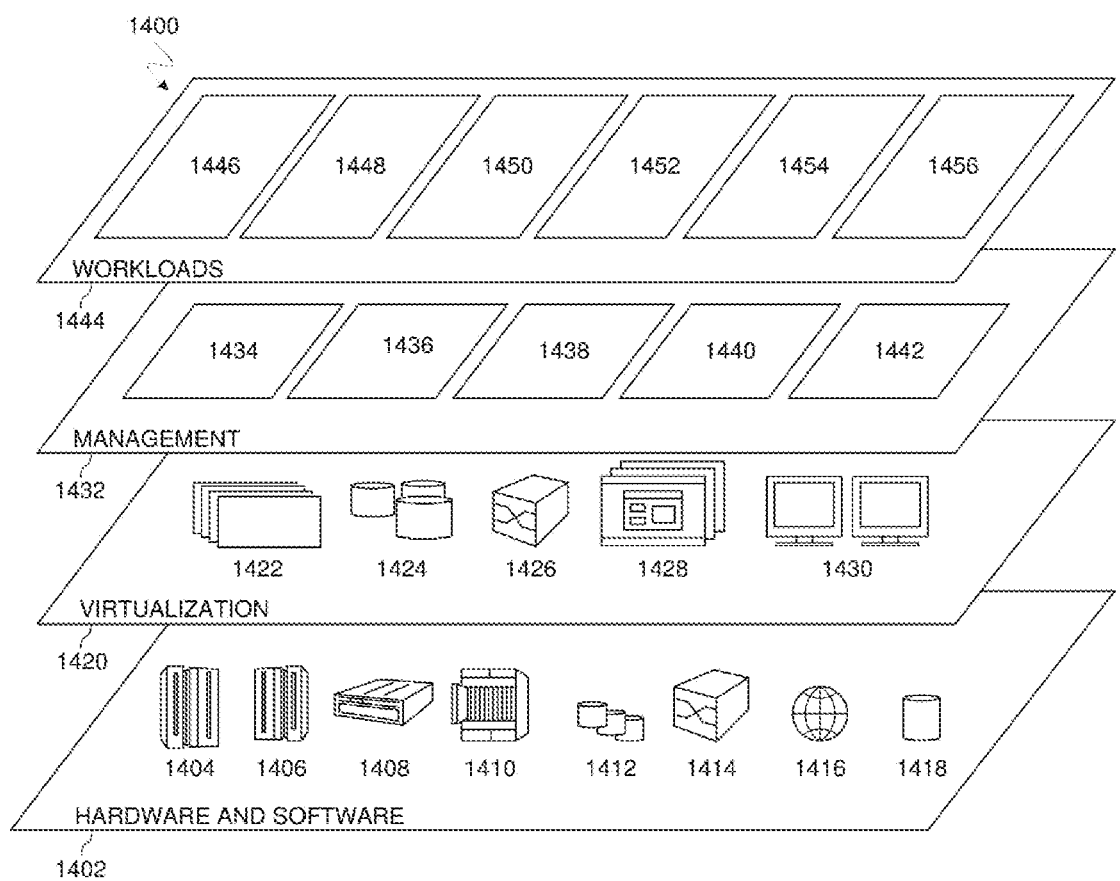

FIG. 14 is a block diagram of functional layers of the illustrative cloud computing environment of FIG. 13, in accordance with an embodiment of the present disclosure.

DETAILED DESCRIPTION

In the context of this description, the following terms and/or expressions may be used:

The term 'cryptographic key object' may denote a data sequence to be used in cryptographic operations by a guest virtual server. The guest virtual server may use the cryptographic key object as a protected key.

The term 'guest virtual server' may denote a virtual machine that mimics a complete computer system and that is executed in or on a hypervisor. A hypervisor may represent a layer between a real hardware system and a plurality of virtual machines which may be isolated from each other. When virtual machines are isolated from each other, a fatal error in or on one of the virtual machines does not affect another one of the virtual machines.

The term 'cryptographic operation' may denote an encryption or decryption of data to protect the data against unauthorized access. Additionally, the 'cryptographic operation' may also relate to a sign or verify operation to perform proof of the integrity of data.

The term 'trusted hypervisor' may denote a hypervisor which may be constructed and embedded into a real hardware system and which may be in communicative exchange with firmware in a way that may not be compromised by unauthorized personal. In order to achieve this security for the hypervisor, organizational provisions may be made. For example, access to a terminal for an installation or management of the trusted hypervisor may be restricted. Alternatively, a software-only hypervisor may be used as a trusted hypervisor provided that organizational measures are taken to protect the hypervisor against unauthorized access to security keys and to other confidential data that is managed by the hypervisor.

Moreover, the trusted hypervisor—or in short 'hypervisor'—may provide hyper-calls to a guest virtual server to (a) generate a random key token which is a random key wrapped by a guest wrapping key and (b) transform a key token into a protected key. Both of these calls may take a guest secret as argument that allows the trusted hypervisor to associate the correct satellite virtual server.

The hyper-call (a) described above may be executed by the hypervisor, but the guest wrapping key would be exposed during that operation. The hyper-call (a) may preferably be executed by the service of the satellite virtual server which, when upon being initialized with the guest wrapping key, may transform the guest wrapping key into a protected key, and therefore protect the guest wrapping key while using the guest wrapping key to wrap a random key.

Hyper-call (b) may be executed by the service of the satellite virtual server that is associated with the guest virtual server that is calling. The satellite virtual server may then unwrap the key token using its copy of the guest wrapping key (which may be a protected key) and may convert the unwrapped key immediately into a protected key which it returns to the hypervisor.

The term 'guest credentials' may denote any code data specific for a guest virtual server. The guest credentials may be entered or otherwise provided by a user or may be stored in persistent storage accessible by the guest virtual server—e.g., a key storage in form of a USB stick.

The term 'satellite virtual server instance' may denote a hidden virtual machine running on a trusted hypervisor in parallel to a guest virtual machine. There may be a 1:1 correlation between the guest virtual server and the satellite virtual server. The satellite virtual server may be generated on the request of the guest virtual server for the sole purpose to provide protected keys to the guest virtual server. The satellite virtual server may be restricted in function and may not be able to initiate a request and therefore would not have its own guest secret. The satellite virtual server may be associated to a secret of a guest, for example to a guest secret from its corresponding guest virtual machine.

The term 'virtual server' may be used as a synonym for the term virtual machine that is executed as software on a hypervisor. This term may apply to the guest virtual server as well as to the satellite virtual server.

The term 'master key' may denote a secret code, e.g., specific to the hardware host machine and embedded in the firmware of the hardware machine. Alternatively, the term may denote a virtual server master key (VS-MK), i.e., a master key that is associated with a specific guest virtual system. No two guest virtual systems would have the same VS-MK, unless one is a satellite virtual server of the other one.

The term 'random guest key' may denote a code generated by the hypervisor to be wrapped with a guest wrapping key associated with guest credentials.

The term 'guest wrapping key' may denote a key, e.g., a sequence of digital data, used by a hypervisor to wrap a random guest key, i.e., to protect the random guest key from unauthorized access.

The term 'satellite virtual server' may denote a virtual machine that provides services to the hypervisor, for example, (a) that converts a key wrapped by the guest wrapping key of the associated guest virtual server so that the key becomes a protected key for the associated guest virtual server, and optionally (b) that generates a random key wrapped by a guest wrapping key of an associated guest virtual server.

The term "crypto control block" (CRYCB) may denote a data structure specific to a virtual machine—e.g., specific to a guest virtual server or to a satellite virtual server. The CRYCB may be generated during instantiation of a virtual machine on a hypervisor under the control of the hypervisor. In the here-proposed invention, the CRYCB for the guest virtual server and for the related satellite virtual server may be identical or may include some identical data.

In the following, a detailed description of the figures will be given. All instructions in the figures are schematic. Firstly, a block diagram of an embodiment of the inventive computer-implemented method for providing a cryptographic key object to a guest virtual server for use in cryptographic operations is given. Afterwards, further embodiments, as well as embodiments of the protected key providing system for providing a cryptographic key object to a guest virtual server for use in cryptographic operations, will be described.

FIG. 1 shows a block diagram of a preferred embodiment of the computer-implemented method 100 for providing a cryptographic key object—in particular, the protected key—to a guest virtual server for use in cryptographic operations. The method 100 may include a step 102 of a guest virtual sever registering with a trusted hypervisor using guest credentials. The guest credentials may be a guest virtual server specific secret which may be input by a user, which may have been input by a file, or which may have come from another source. In another step 104, the trusted hypervisor generates a guest wrapping key for a registered guest virtual server. The trusted hypervisor may associate the guest wrapping key with the guest credentials that were used for the registration of the guest virtual server with the trusted hypervisor.

In another step 106, upon receiving a request—e.g., an initialization request—from the guest virtual server with the guest credentials as an argument, the trusted hypervisor generates a satellite virtual server instance for the guest virtual server. The requesting and the generation may be regarded as one integrated activity. The satellite virtual server is configured with virtual server specific data—in particular, the same data in the CRYCB—from the guest virtual server. The satellite virtual server and the guest virtual server may share a master key, for example, may share a VS-MK. Thus, the data in the CRYCB (crypto control block) of the guest virtual server and the satellite virtual server are principally identical. A further constraint is that the master key cannot be accessed by the trusted hypervisor or by any guest virtual server. This protection may be achieved by hiding the master key in the firmware. Consequently, no guest virtual server can directly access its own master key.

Additionally, the method 100 may include a step 108 of the trusted hypervisor passing a copy of the guest wrapping key to the satellite server instance. This passing can be performed in any initialization step or as part of the conversion request. The guest wrapping key is the guest wrapping key that is associated with the guest credentials of a request, namely the request for initialization or alternatively for the wrapped key generation.

The method 100 also may include a step 110 of the guest virtual server requesting a random guest key that is wrapped by the guest wrapping key. Moreover, the method 100 may include a step 112 of the trusted hypervisor generating the random guest key. The method 100 may include a step 114 of the trusted hypervisor wrapping the random guest key with a guest wrapping key that is associated with the guest credentials.

The method 100 also may include a step 116 of converting the wrapped guest key into a protected key. The converting may happen upon receiving a conversion request from the guest virtual server and may happen before the wrapped guest key is used by the guest virtual server that was sent from the hypervisor. This converting or conversion may include the satellite virtual server re-wrapping the wrapped guest key with its master key that is specific to both the guest virtual server and the satellite virtual server. Hence, the wrapped guest key may be converted into a protected guest key that serves as the cryptographic key object.

FIG. 2 shows an exemplary flowchart 200 for generating the guest wrapping key. This may happen at the first loading of the guest virtual server. In a step 202, the guest virtual server may request the hypervisor to generate a guest wrapping key and associate the guest wrapping key with guest credentials, e.g. with a guest secret. In a step 204, based on the request the hypervisor may generate a new random key and may associate the new random key with the cryptographic hash of the guest secret. Furthermore in step 206, the hypervisor may store this association of the hash and the random key in a repository.

FIG. 3 shows a block diagram 300 of components instrumental for generating the guest wrapping key. A hypervisor 302 cooperates with a firmware 304 and thereby may form a trusted hypervisor. In the case of a software-only hypervisor, operational restrictions of the environment are in place to protect the operation of the hypervisor so that it constitutes a trusted hypervisor. Embedded in the firmware 304 is a host-master-key (host-MK) 306. The host-MK 306 may be used together with a crypto control block (CRYCB) 308 and with a guest master key pattern from a guest virtual server crypto control block 314 to generate a guest master key 310.

At the initialization or the first usage of the guest virtual server (GVS) 312, the guest virtual server 312 may access guess credentials that may be a guest secret 316. The guest secret 316, for example, may be a user input or may be from another source. The guest secret 316 may be a password or may be like a password. The guest secret 316 may be transformed in a one-way form to a hash value 322. Additionally, the hypervisor 302 may generate a guest wrapping key 320. The hypervisor 302 may associate the guest wrapping key 320 with the hash value 322, as is shown by the double arrow between the hash value 322 of the guest secret 316 and the guest wrapping key 320. Both the hash value 322 of the guest secret 316 and the guest wrapping key 320 are stored persistently in the repository 318. This storage allows the guest wrapping key 320 to continue to exist even if the guest virtual server 312 is rebooted, suspended to disk, or resumed and/or migrated to another part of the system using another hypervisor.

FIG. 4 shows an exemplary flowchart 400 for at least one embodiment of steps for an initiation of a satellite virtual server. At step 402, the guest virtual server 312 sends a request to the hypervisor 302 to initiate or initialize a satellite virtual server and to associate the satellite virtual server with a guest virtual server secret. The guest virtual server specific secret may be input by a user, may be input by a file, or may come from another secret source. Because the guest virtual server 312 is the same as used in the previous steps, the secret will be the same as the guest secret 316 that was used to generate the guest wrapping key 320. Upon this request, at step 404 the hypervisor 302 starts a satellite virtual server instance using the same wrapping key configuration that the calling client used, i.e., using the same wrapping key configuration that the guest virtual server 312 used. In other words, the hypervisor 302 uses the crypto control block CRYCB 314 that was already used to instantiate the guest virtual server 312.

In a step 406, the hypervisor 302 determines the hash value 322 of the guest secret 316 and stores the guest wrapping key 320 associated with the hash value 322 in the satellite virtual server. Because the guest secrets were the same, the hash determined in step 406 will be the same as was used in steps 200. A hash is a deterministic function. At step 408, the hypervisor 302 associates the satellite virtual server with the hash value 322.

The guest virtual server secret is meant to refer to a specific wrapping key in the database, e.g., in the repository 318. The hypervisor 302 must—for the lifetime of the guest (i.e., as long as the guest is running)—remember that the just-created satellite server shall be used whenever a subsequent request with the guest virtual server secret as an argument is issued to the hypervisor 302.

Because the life span of a running guest cannot exceed the life span of its host (i.e. the life span of the hypervisor 302), that association (e.g. a pair consisting of a hash and a reference to the satellite virtual server) need not be stored in an external data base, but should be stored somewhere in the memory of the hypervisor. For example, for each guest that has issued an initialization request, the hypervisor 302 maintains a pair of the hash of a secret (used during the initialization) and a reference to the satellite virtual server. For example, in Linux KVM (Kernel-based virtual machine) this reference could be a process ID of a QEMU (an open source machine emulator and virtualizer) process that runs the satellite virtual server.

FIG. 5 shows a block diagram 500 of components involved in the process of initiating the satellite virtual server. Components already discussed earlier will not be described again, and the reference numerals of the earlier figures for the same object are reused.

The satellite guest virtual server 502 (shown next to the guest virtual server 312) is started by the hypervisor 302 using the same master key configuration or wrapping key configuration that the guest virtual server 312 used, e.g., by using the crypto control block 314 which was used to instantiate the guest virtual server 312. A copy of the guest wrapping key 320 is stored in the system of the satellite guest virtual server 502 (indicated by the arrow between the two instances of 320). As a result of the process shown as the flowchart in FIG. 4, the hash value 322 of the guest secret 316 also exists in the satellite guest virtual server 502 (indicated by the arrows from the repository 318 to the satellite guest virtual server 502).

The sole task of the satellite guest virtual server 502 may be to provide a function for converting a key wrapped by a guest wrapping key into a protected key. Hence, no other functions may be available within the satellite guest virtual server 502; therefore, the satellite guest virtual server 502 cannot be misused for any cyber-attacks.

FIG. 6 shows an exemplary flowchart 600 that illustrates a method for generating a random wrapped key. In a step 602, the guest virtual server 312 may send a request to the hypervisor 302 and may provide a guest secret to the hypervisor 302. The request is for the hypervisor 302 to return a random key that is wrapped by the guest wrapping key 320 associated with the guest secret. Because the virtual guest server 312 is the same used in the previous steps 200 and 400, the guest secret here will be the same as the guest secret 316 used earlier so that the system will be able to identify the correct saved information in the repository 318. A guest could register, for example, two different secrets with the hypervisor 302, then have two different wrapping keys and two different satellite servers. Depending on the secret used in the request, then one or the other wrapping key and satellite server would be used by the hypervisor 302 in fulfilling the request. In return in step 604, the hypervisor 302 determines the hash of the guest secret and generates a random key wrapped by its guest wrapping key. Hence, no direct communication happens between the guest virtual server and the satellite virtual server. In step 606, the hypervisor returns the random key wrapped by the guest wrapping key to the guest virtual server.

FIG. 7 shows a block diagram 700 of components involved in the generation of the random key, as just described by the activity flowchart of FIG. 6. FIG. 7 shows that the hypervisor 302 has generated a random key 702.

FIG. 8 shows a similar block diagram 800 of components that were shown in FIG. 7, but shows the further actions to complete the wrapped random key. FIG. 8 shows that the random key 702 (FIG. 7) is now wrapped using the guest wrapping key 320 from the satellite guest virtual server instance 502, and thereby forms a wrapped guest key 802. The wrapped guest key 802 that is wrapped by the guest wrapping key 320 is made available to the guest virtual server (GVS) 312.

Once the wrapped guest key 802 has been moved to or received by the guest virtual server 312, the initial version of the random key 702 (FIG. 7) and the initial version of the wrapped guest key 802, i.e. the wrapped guest key 802 shown to the left in FIG. 8, may no longer exist, e.g., may be deleted.

FIG. 9 shows an exemplary flowchart 900 for the transformation of the wrapped guest key 802 into a protected key. In a step 902, the guest virtual server 312 sends a request to the hypervisor 302 to return a key wrapped by the guest virtual server master key 310 (VS-MK) starting from the wrapped guest key 802 that was wrapped by a guest wrapping key 320 associated with the guest secret provided in the request. In another step 904, the hypervisor 302 determines the hash value of the guest secret of this request and requests the associated satellite virtual server to transform the wrapped guest key 802 that was wrapped by the guest wrapping key 320 into a key wrapped by its guest master key 310.

In a step 906, the satellite guest virtual server 502 unwraps the wrapped guest key 802 using the guest wrapping key 320. In a step 908, the satellite guest virtual server 502 requests from the firmware 304 (via the hypervisor 302) to wrap the unwrapped key with its master key 310 and return the results to the hypervisor 302. In another step 910, the hypervisor 302 returns the received the key wrapped by the guest master key 310 to the guest virtual server 312. Herewith the loop is closed and the guest virtual server 312 has received the protected key—i.e., the cryptographic key object—to be used for further cryptographic functions by the guest virtual server 312 without the requirement to use a hardware security module.

FIG. 10 shows a block diagram 1000 of all components supporting the generation of the protected key, as just described in the context of the steps illustrated in FIG. 9. The random key 702 wrapped by the guest wrapping key 320 to be a wrapped guest key 802 is unwrapped in the satellite guest virtual server 502 and is sent via the hypervisor 302 to the firmware 304. Here, the unwrapped guest key 1002 is wrapped with the master key 310 and is returned via the hypervisor 302 as a protected key 1004 to the guest virtual server 312.

Here, the copy of the wrapped guest key 802 may be seen in the guest virtual server 312 and in the satellite guest virtual server 502. However, after the wrapped guest key 802 has been unwrapped to become unwrapped guest key 1002, the wrapped guest key 802 may be "forgotten", i.e., may be deleted in the satellite guest virtual server 502. Thus, the unwrapped guest key 1002 may exist only in transition. Also, the unwrapped guest key 1002 may be deleted in the satellite guest virtual server 502 after the request to the firmware 304 is fulfilled. The unwrapped guest key 1002 is no longer needed. The same will happen to the version of the protected key 1004 that is in the firmware after the protected key 1004 has been transferred to the guest virtual server 312.

FIG. 11 shows a block diagram of an embodiment of the inventive protective key providing system 1100 that provides a cryptographic key object to a guest virtual server 312 for use in cryptographic operations. The system 1100 may include a registration unit 1102 enabling the guest virtual server 312 to register with a trusted hypervisor 302 using guest credentials. The system 1100 may also include a first generator module 1104 enabling the trusted hypervisor 302 to generate a guest wrapping key 320 and to associate the guest wrapping key 320 with the guest credentials.

The system 1100 also may include a second generator module 1106 which becomes active upon receiving a request from the guest virtual server 312 with the guest credentials as an argument. In that case, the second generator module 1106, triggered or otherwise activated by the trusted hypervisor 302, is adapted to generate, for the guest virtual server 312, a satellite guest virtual server instance 502 configured with virtual server specific data from the guest virtual server 312. The guest virtual server 312 shares its master key 310 with the satellite guest virtual server instance 502. In any case, the master key 310 cannot be accessed by the trusted hypervisor 302 or by any guest virtual server.

The guest virtual server 312 may share the master key 310 without having access to the master key. A crypto request is sent to the system with a protected key (key wrapped by master key). The system knows from which virtual server the crypto request comes from and uses the master key for that virtual server to unwrap the protected key. Then the crypto operation would be performed based on the plain text key in the CPU. Therefore, crypto operations can be performed without the virtual server ever knowing the actual encryption key.

Furthermore, the system 1100 may include a passing module 1108 that enables the trusted hypervisor 302 to pass a copy of the guest wrapping key 320 associated with the guest credentials of a request to the satellite guest virtual server instance 502. The system 1100 also may include a third generator module 1110 that enables the trusted hypervisor 302 to generate a random key 702.

Additionally, the system 1100 may include a wrapping module 1112 that enables the trusted hypervisor 302 to wrap the random key 702 with a guest wrapping key 320 associated with the guest credentials, thereby producing a wrapped guest key 802.

Also, the system 1100 may include a requesting unit 1114 that requests a conversion of the wrapped guest key 802 into a protected key, before using the wrapped guest key 802. The conversion may include the satellite guest virtual server instance 502 re-wrapping the wrapped guest key 802 with the master key 310. The master key 310 may be specific to both the guest virtual server 312 and the satellite guest virtual server 502 or may be shared by the guest virtual server 312 and the satellite guest virtual server 502. With the re-wrapping, the wrapped guest key 802 may be converted into a protected guest key 1004, serving as the cryptographic key object.

It may be noted that the mentioned units and modules may be interconnected directly or indirectly for an information and/or signal exchange. Alternatively, the registration unit 1102, the first generator module 1104, the second generator module 1106, the passing module 1108, the third generator module 1110, the wrapping module 1112 and requesting unit 1114 may be interconnected via the internal bus system 1116 of the protective key providing system 1100. These units and modules may be formed via software.

Embodiments of the invention may be implemented together with virtually any type of computer, regardless of the platform being suitable for storing and/or executing program code. FIG. 12 shows, as an example, a computing system 1200 suitable for executing program code related to the proposed method.

The computing system 1200 is only one example of a suitable computer system, and is not intended to suggest any limitation as to the scope of use or functionality of embodiments of the invention described herein, regardless, whether the computing system 1200 is capable of being implemented and/or performing any of the functionality set forth hereinabove. In the computer system 1200, there are components, which are operational with numerous other general purpose or special purpose computing system environments or configurations. Examples of well-known computing systems, environments, and/or configurations that may be suitable for use with computer system/server 1200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1200 may be described in the general context of computer system-executable instructions, such as program modules, being executed by a computer system 1200. Generally, program modules may include routines, programs, objects, components, logic, data structures, and so on that perform particular tasks or implement particular abstract data types. Computer system/server 1200 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 1200 is shown in the form of a general-purpose computing device. The components of computer system/server 1200 may include, but are not limited to, one or more processors or processing units 1202, a system memory 1204, and a bus 1206 that couples various system components including system memory 1204 to the processor 1202. Bus 1206 represents one or more of any of several types of bus structures, including a memory bus or memory controller, a peripheral bus, an accelerated graphics port, and a processor or local bus using any of a variety of bus architectures. By way of example, and not limiting, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1200 typically includes a variety of computer system readable media. Such media may be any available media that is accessible by computer system/server 1200, and it includes both, volatile and non-volatile media, removable and non-removable media.

The system memory 1204 may include computer system readable media in the form of volatile memory, such as random access memory (RAM) 1208 and/or cache memory 1210. Computer system/server 1200 may further include other removable/non-removable, volatile/non-volatile computer system storage media. By way of example only, a storage system 1212 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1206 by one or more data media interfaces. As will be further depicted and described below, memory 1204 may include at least one program product having a set (e.g., at least one) of program modules that are configured to carry out the functions of embodiments of the invention.

The program/utility, having a set (at least one) of program modules 1216, may be stored in memory 1204, for example. An operating system, one or more application programs, other program modules, and program data may also be stored in memory 1204. Each of the operating systems, one or more application programs, other program modules, and program data or some combination thereof, may include an implementation of a networking environment. Program modules 1216 generally carry out the functions and/or methodologies of embodiments of the invention, as described herein.

The computer system/server 1200 may also communicate with one or more external devices 1218 such as a keyboard, a pointing device, a display 1220, etc.; one or more devices that enable a user to interact with computer system/server 1200; and/or any devices (e.g., network card, modem, etc.) that enable computer system/server 1200 to communicate with one or more other computing devices. Such communication can occur via Input/Output (I/O) interfaces 1214. Still yet, computer system/server 1200 may communicate with one or more networks such as a local area network (LAN), a general wide area network (WAN), and/or a public network (e.g., the Internet) via network adapter 1222. As depicted, network adapter 1222 may communicate with the other components of the computer system/server 1200 via bus 1206. It should be understood that, although not shown, other hardware and/or software components could be used in conjunction with computer system/server 1200. Examples, include, but are not limited to: microcode, device drivers, redundant processing units, external disk drive arrays, RAID systems, tape drives, and data archival storage systems, etc.

Additionally, the protected key providing system 1100 for providing a cryptographic key object to a guest virtual server for use in cryptographic operations may be attached to the bus system 1206.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

For the embodiments taking the form of a related computer program product, the program code may be accessible from a computer-usable or computer-readable medium and may be suitable for use, by, or in connection, with a computer or any instruction execution system. For the purpose of this description, a computer-usable or computer-readable medium may be any apparatus that may contain units or modules for storing, communicating, propagating or transporting the program for use, by, or in connection, with the instruction execution system, apparatus, or device.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 13, illustrative cloud computing environment 1300 is depicted. As shown, cloud computing environment 1300 comprises one or more cloud computing nodes 1200 with which local computing devices used by cloud consumers, such as, for example, personal digital assistant (PDA) or cellular telephone 1300A, desktop computer 1300B, laptop computer 1300C, and/or automobile computer system 1300N may communicate. Nodes 1200 may communicate with one another. They may be grouped (not shown) physically or virtually, in one or more networks, such as Private, Community, Public, or Hybrid clouds as described hereinabove, or a combination thereof. This allows cloud computing environment 1300 to offer infrastructure, platforms and/or software as services for which a cloud consumer does not need to maintain resources on a local computing device. It is understood that the types of computing devices 1300A-N shown in FIG. 13 are intended to be illustrative only and that computing nodes 1200 and cloud computing environment 1300 can communicate with any type of computerized device over any type of network and/or network addressable connection (e.g., using a web browser).

Referring now to FIG. 14, a set of functional abstraction layers 1400 provided by cloud computing environment 1300 is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1402 includes hardware and software components. Examples of hardware components include: mainframes 1404; RISC (Reduced Instruction Set Computer) architecture based servers 1406; servers 1408; blade servers 1410; storage devices 1412; and networks and networking components 1414. In some embodiments, software components include network application server software 1416 and database software 1418.

Virtualization layer 1420 provides an abstraction layer from which the following examples of virtual entities may be provided: virtual servers 1422; virtual storage 1424; virtual networks 1426, including virtual private networks; virtual applications and operating systems 1428; and virtual clients 1430.

In one example, management layer 1432 may provide the functions described below. Resource provisioning 1434 provides dynamic procurement of computing resources and other resources that are utilized to perform tasks within the cloud computing environment. Metering and Pricing 1436 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1438 provides access to the cloud computing environment for consumers and system administrators. Service level management 1440 provides cloud computing resource allocation and management such that required service levels are met. Service Level Agreement (SLA) planning and fulfillment 1442 provide pre-arrangement for, and procurement of, cloud computing resources for which a future requirement is anticipated in accordance with an SLA.

Workloads layer 1444 provides examples of functionality for which the cloud computing environment may be utilized. Examples of workloads and functions which may be provided from this layer include: mapping and navigation 1446; software development and lifecycle management 1448; virtual classroom education delivery 1450; data analytics processing 1452; transaction processing 1454; and cryptographic key object processing and protected key providing processing 1456. The functionalities of cryptographic key object processing and protected key providing processing were described in the aforementioned embodiments of the present invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for cryptography, the computer-implemented method comprising:
    registering a guest virtual server with a trusted hypervisor by using guest credentials;
    computing via the trusted hypervisor a hash value of the guest credentials;
    generating a guest wrapping key and associating the hash value of the guest credentials with the guest wrapping key;
    storing the hash value of the guest credentials and the guest wrapping key in a memory;
    generating a satellite virtual server instance configured with virtual server specific data from the guest virtual server;
    passing a copy of the guest wrapping key to the satellite virtual server instance;
    wrapping, via the satellite virtual server instance, a random guest key with the guest wrapping key, thereby producing a wrapped random guest key;
    passing the wrapped random guest key to the guest virtual server;
    in response to a request from the guest virtual server, unwrapping, via the satellite virtual server instance and the guest wrapping key, the wrapped random guest key to form an unwrapped key;
    rewrapping the unwrapped key with a master key to form a protected guest key; and
    passing a copy of the protected guest key to the guest virtual server.

2. The computer-implemented method according to claim 1, further comprising sending a conversion request from the guest virtual server, the conversion request comprising the guest credentials as a conversion argument, the rewrapping being performed in response to reception of the conversion request.

3. The computer-implemented method according to claim 1, wherein the trusted hypervisor maintains the memory.

4. The computer-implemented method according to claim 3, further comprising protecting the memory with a passphrase.

5. The computer-implemented method according to claim 1, wherein the computing the hash value comprises using a cryptographic one-way function.

6. The computer-implemented method according to claim 1, further comprising protecting the guest wrapping key via a hardware security module.

7. The computer-implemented method according to claim 1, further comprising:
    storing the virtual server specific data in a crypto control block of a virtual machine.

8. The computer-implemented method according to claim 1, wherein the satellite virtual server instance has a sole interface, and
    wherein the sole interface connects to the trusted hypervisor.

9. The computer-implemented method according to claim 1, further comprising:
    generating the random guest key via the trusted hypervisor using a service from the satellite virtual server instance,
    wherein the wrapping of the random guest key occurs via the trusted hypervisor using the service from the satellite virtual server instance.

10. The computer-implemented method according to claim 1, further comprising authorizing, by the trusted hypervisor, each request following the registering,
    wherein the authorizing comprises using additional guest credentials provided with a respective request following the registering.

11. The computer-implemented method according to claim 1, further comprising authorizing, by the trusted hypervisor, a further request of the guest virtual server following the registering, wherein the authorizing comprises using guest specific data.

12. The computer-implemented method of claim 1, wherein the satellite virtual server instance shares the master key with the guest virtual server.

13. The computer-implemented method of claim 1, wherein the satellite virtual server instance and the guest virtual server are disposed within a same computer.

14. A computer system for cryptography, the computer system comprising:
    one or more processors, one or more computer-readable memories, and program instructions stored on at least one of the one or more computer-readable memories for execution by at least one of the one or more processors to cause the computer system to:
        register a guest virtual server with a trusted hypervisor by using guest credentials;
        compute via the trusted hypervisor a hash value of the guest credentials;
        generate a guest wrapping key and associate the hash value of the guest credentials with the guest wrapping key;
        store the hash value of the guest credentials and the guest wrapping key in a memory;
        generate a satellite virtual server instance configured with virtual server specific data from the guest virtual server;
        pass a copy of the guest wrapping key to the satellite virtual server instance;
        wrap, via the satellite virtual server instance, a random guest key with the guest wrapping key, thereby producing a wrapped random guest key;

pass the wrapped random guest key to the guest virtual server;

in response to a request from the guest virtual server, unwrap, via the satellite virtual server instance and the guest wrapping key, the wrapped random guest key to form an unwrapped key;

rewrap the unwrapped key with a master key to form a protected guest key; and pass a copy of the protected guest key to the guest virtual server.

15. The computer system according to claim 14, wherein the program instructions are further for execution by the at least one of the one or more processors to cause the computer system to send a conversion request from the guest virtual server, the conversion request comprising the guest credentials as a conversion argument, the rewrapping being performed in response to reception of the conversion request.

16. The computer system according to claim 14, wherein the trusted hypervisor maintains the memory.

17. The computer system according to claim 16, wherein the program instructions are further for execution by the at least one of the one or more processors to cause the computer system to protect the memory with a passphrase.

18. The computer system according to claim 14, wherein the computing the hash value comprises using a cryptographic one-way function.

19. The computer system according to claim 14, wherein the program instructions are further for execution by the at least one of the one or more processors to cause the computer system to protect the guest wrapping key via a hardware security module.

20. A computer program product for cryptography, the computer program product comprising a computer readable storage medium having program instructions embodied therewith, the program instructions being executable by a processor to cause the processor to:

register a guest virtual server with a trusted hypervisor by using guest credentials;

compute via the trusted hypervisor a hash value of the guest credentials;

generate a guest wrapping key and associate the hash value of the guest credentials with the guest wrapping key;

store the hash value of the guest credentials and the guest wrapping key in a memory;

generate a satellite virtual server instance configured with virtual server specific data from the guest virtual server;

pass a copy of the guest wrapping key to the satellite virtual server instance;

wrap, via the satellite virtual server instance, a random guest key with the guest wrapping key, thereby producing a wrapped random guest key;

pass the wrapped random guest key to the guest virtual server;

in response to a request from the guest virtual server, unwrap, via the satellite virtual server instance and the guest wrapping key, the wrapped random guest key to form an unwrapped key;

rewrap the wrapped guest key with the master key to form a protected guest key; and pass a copy of the protected guest key to the guest virtual server.

* * * * *